(12) United States Patent
Mehta et al.

(10) Patent No.: US 11,792,688 B2
(45) Date of Patent: *Oct. 17, 2023

(54) SYSTEMS AND METHODS FOR A SCALABLE HETEROGENEOUS NETWORK ORCHESTRATOR

(71) Applicant: Parallel Wireless, Inc., Nashua, NH (US)

(72) Inventors: Pratik Vinod Mehta, Pune (IN); Kartik Shashikant Raval, Pune (IN); Ravi Nathwani, Pune (IN); Kaitki Agarwal, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 171 days.

This patent is subject to a terminal disclaimer.

(21) Appl. No.: 16/947,514

(22) Filed: Aug. 4, 2020

(65) Prior Publication Data
US 2020/0367105 A1 Nov. 19, 2020

Related U.S. Application Data

(63) Continuation of application No. 15/878,412, filed on Jan. 23, 2018, now Pat. No. 10,735,996.

(60) Provisional application No. 62/449,508, filed on Jan. 23, 2017.

(51) Int. Cl.
*H04W 24/02* (2009.01)
*H04W 24/08* (2009.01)
*H04W 28/082* (2023.01)

(52) U.S. Cl.
CPC ......... *H04W 28/082* (2023.05); *H04W 24/02* (2013.01)

(58) Field of Classification Search
None
See application file for complete search history.

(56) References Cited

U.S. PATENT DOCUMENTS

| 8,549,146 | B2 * | 10/2013 | Stanisic | H04L 45/00 709/228 |
| 8,654,668 | B2 * | 2/2014 | Fendick | H04L 45/60 370/252 |
| 9,432,305 | B1 * | 8/2016 | Das | H04L 61/4511 |

(Continued)

*Primary Examiner* — Duc T Duong
(74) *Attorney, Agent, or Firm* — Michael Y. Saji; David W. Rouille

(57) ABSTRACT

Systems and methods for a scalable network orchestrator for orchestrating a radio access network are disclosed. In one embodiment, a system is disclosed, comprising: a management module for performing system management functions, a control plane processing module for performing radio access coordination functions and user mobile device coordination functions, a data plane processing module for receiving user mobile device data and forwarding the user mobile device data to the user mobile device or to a mobile operator core network, and for decrypting, demultiplexing and forwarding system management traffic to the management module or control plane processing module; a load balancer for receiving and directing traffic; and an interconnect medium coupled to each of these modules and providing point-to-point connectivity for each coupled module, wherein the at least one management module is configured to support addition, subtraction, and failover of load balancers, control plane processing modules, and data plane processing modules.

6 Claims, 8 Drawing Sheets

(56) References Cited

U.S. PATENT DOCUMENTS

| | | | |
|---|---|---|---|
| 10,250,562 B1* | 4/2019 | Srinath | H04L 63/0209 |
| 2009/0303880 A1* | 12/2009 | Maltz | H04L 45/02 |
| | | | 370/235 |
| 2012/0063419 A1 | 3/2012 | Zhao et al. | |
| 2012/0236708 A1 | 9/2012 | Kompella et al. | |
| 2012/0236823 A1 | 9/2012 | Kompella et al. | |
| 2012/0239966 A1 | 9/2012 | Kompella et al. | |
| 2013/0163424 A1* | 6/2013 | Goerke | H04L 43/00 |
| | | | 370/328 |
| 2013/0167181 A1* | 6/2013 | Dixit | H04L 65/602 |
| | | | 725/95 |
| 2013/0243075 A1* | 9/2013 | Dalela | H04L 65/80 |
| | | | 375/E7.026 |
| 2014/0101306 A1* | 4/2014 | Murgia | H04L 47/125 |
| | | | 709/224 |
| 2014/0310418 A1* | 10/2014 | Sorenson, III | H04L 67/1038 |
| | | | 709/226 |
| 2015/0039763 A1* | 2/2015 | Chaudhary | H04L 47/125 |
| | | | 709/226 |
| 2015/0109995 A1* | 4/2015 | Mathai | H04L 12/4641 |
| | | | 370/328 |
| 2015/0124622 A1* | 5/2015 | Kovvali | H04W 24/08 |
| | | | 370/236 |
| 2015/0341428 A1* | 11/2015 | Chauhan | H04L 69/16 |
| | | | 709/203 |
| 2016/0073282 A1* | 3/2016 | Speicher | H04L 47/41 |
| | | | 370/230 |
| 2016/0127169 A1* | 5/2016 | Rosa de Sousa Teixeira | H04L 47/828 |
| | | | 370/216 |
| 2016/0352865 A1* | 12/2016 | Gupta | H04L 43/0864 |
| 2016/0373304 A1* | 12/2016 | Sharma | H04L 43/00 |
| 2017/0093724 A1* | 3/2017 | Bansal | H04L 41/0896 |
| 2017/0126798 A1* | 5/2017 | Khojastepour | G06F 9/5083 |
| 2017/0264488 A1* | 9/2017 | Ben Ami | H04L 67/12 |
| 2017/0272330 A1* | 9/2017 | Cao | H04W 84/045 |
| 2018/0006935 A1* | 1/2018 | Mutnuru | H04L 45/24 |
| 2018/0091420 A1* | 3/2018 | Drake | H04L 69/325 |
| 2018/0176306 A1* | 6/2018 | Kahn | H04L 67/141 |
| 2018/0205574 A1* | 7/2018 | Radunovic | H04L 41/0668 |
| 2018/0225139 A1* | 8/2018 | Hahn | G06F 9/5077 |
| 2018/0357086 A1* | 12/2018 | Kinsella | G06F 9/5077 |
| 2018/0376338 A1* | 12/2018 | Ashrafi | H04L 67/10 |
| 2021/0314404 A1* | 10/2021 | Glek | H04L 67/1004 |

\* cited by examiner

SYSTEMS AND METHODS FOR A SCALABLE HETEROGENEOUS NETWORK ORCHESTRATOR

CROSS-REFERENCE TO RELATED APPLICATIONS

This application is a continuation under 35 U.S.C. § 120 of U.S. patent application Ser. No. 15/878,412, filed Jan. 23, 2018, and entitled "Systems and Methods for a Scalable Heterogeneous Network Orchestrator," which itself claims priority under 35 U.S.C. § 119(e) of U.S. Provisional App. No. 62/449,508, titled "Scaling and Redundancy for Telecom Access/Core Functions Like Venb, Vhnb, and Vrnc,", and filed Jan. 23, 2017, each of which is hereby incorporated by reference herein in their entireties for all purposes. U.S. Pat. App. Pub. Nos. US20150257051, US20140086120, US20140092765, US20140133456, US20140233412, US20150045063, US20150078167, US20150173111, and US20160135132 are also hereby incorporated by reference in their entirety for all purposes, and may describe certain aspects or embodiments, as well as features that may constitute parts of the present disclosure.

BACKGROUND

Cellular telecommunications networks utilize base stations, which provide access for mobile devices (sometimes called User Equipments or UEs) to the telecommunications core network (often called simply "core network"). For example, the 3rd Generation Partnership Project (3GPP) maintains standards for Long Term Evolution (LTE), otherwise known as 4G or 4G LTE, as well as LTE base stations, called eNodeBs. As well, 3GPP maintains and develops standards for the Universal Mobile Telephone System (UMTS, or "3G"), as well as the forthcoming 5G standard and other standards. These cellular access networks are supported by network nodes in the core network, which provide management functions for the base stations, mobility for the attached mobile devices, and data routing and bandwidth for the attached mobile devices. As telecom operators grapple with the increasing demand for mobile network services, a need exists to scale the speed and throughput of these networks, as well as scaling the speed and throughput of the network nodes in the core networks themselves.

Telecom service providers typically have large data centers hosting different nodes from different vendors, each having its own hardware, software and network requirements. The virtual functions provided by telecom nodes typically are high on network I/O for user traffic; high on CPU for packet processing; and require complex network designs. As well, existing nodes are either based on individual COTS (commercial off-the-shelf) rack-mountable servers, developed in such a way as to be tied to specific virtualization environments, or based on specific/proprietary hardware platforms like the ATCA chassis-based platforms, etc., where the software is specifically tailored and designed to run in such environments.

As well, in recent years, telecom operators have begun to seek out the advantages of hardware virtualization and network function virtualization. Virtualization refers to the act of creating a virtual (rather than actual) version of something, including virtual computer hardware platforms, storage devices, and computer network resources; with reference to the data center, virtualization enables the creation of a virtual machine or virtual network device that acts like a real computer, but is operating on software that is executing separate from the underlying hardware resources. At least in theory, such an approach promises increased scalability, upgradeability, efficiency, availability, and reliability.

SUMMARY

Systems and methods for a scalable network orchestrator for orchestrating a radio access network are disclosed. In one embodiment, a system is disclosed, comprising: at least one management module for performing system management functions and sending system management traffic; at least one control plane processing module for performing radio access coordination functions and user mobile device coordination functions, and for sending control plane signaling to radio access network nodes and user mobile devices; at least one data plane processing module for receiving user mobile device data and forwarding the user mobile device data to the user mobile device or to a mobile operator core network, and for decrypting, demultiplexing and forwarding system management traffic to the at least one management module, and for for decrypting, demultiplexing and forwarding control plane traffic to the at least one control plane processing module; at least one load balancer for receiving user mobile device control traffic and user mobile device data traffic, for redirecting the user mobile device control traffic to the at least one control plane processing module, and for redirecting the user mobile device data traffic to the at least one data plane processing module; and an interconnect medium coupled to the at least one management module, the at least one load balancer, the at least one control plane processing module, and the at least one data plane processing module, the interconnect medium providing point-to-point connectivity for each coupled module, wherein the at least one management module is configured to support addition, subtraction, and failover of load balancers, control plane processing modules, and data plane processing modules.

DETAILED DESCRIPTION

As described above, virtualization refers to the act of creating a virtual (rather than actual) version of something, including virtual computer hardware platforms, storage devices, and computer network resources. A virtualization environment allows systems to scale horizontally by adding more physical resources. In such environments, it is often challenging to come up with a generic system architecture wherein different software applications scale, while keeping in mind other important aspects of performance, such as throughput, latency, redundancy, etc. The Parallel Wireless HetNet Gateway™ or HNG is designed to provide virtual functions like a virtual eNodeB (Venb), virtual home NodeB (Vhnb), virtual radio network controller (Vrnc), etc. where each virtual function scales dynamically, providing a true generic virtualization environment. A system architecture is disclosed below that has been developed in order to enable this scalability.

It is desirable to provide virtualization in the telecom data center to reduce costs, similar to the reduction of costs in other industries. However, specific to telecommunications, virtualization-based telecom nodes are typically tied to a specific environment like VMWare etc. Such systems make many hard-to-change design assumptions based on the underlying environment, consequently making any speed or reliability optimizations difficult to implement, and difficult for the systems to be redesigned to run on other environments.

When deployed in a data center, operator/service provider data centers that provide redundancy and scalability tend to become very complex in terms of providing physical and Layer 2 connectivity, as high-bandwidth links are required among all nodes, and also in terms of providing Layer 3 connectivity (IP) that meets operators' needs for network isolation, security, and especially speed; the more traffic required, the more high-speed routers become necessary.

Individual off-the-shelf or COTS servers do scale vertically by adding more power to the servers. However, this is limited to what server hardware vendors can do. With telecom-specific requirements like externally appearing as a single managed node, e.g., in the case of a Home eNodeB gateway or virtualization server, and also supporting various network topologies, including, for example, providing a single externally visible IP or providing network address translation (NAT), it becomes very difficult to scale horizontally with multiple servers, since it makes the software and networking design very complex. Proprietary chassis-based hardware platforms solve the above issues in some cases, but the software is very tied to the underlying platform, which leads to less portable/generic hardware and less performant and more expensive hardware.

Figure 1:
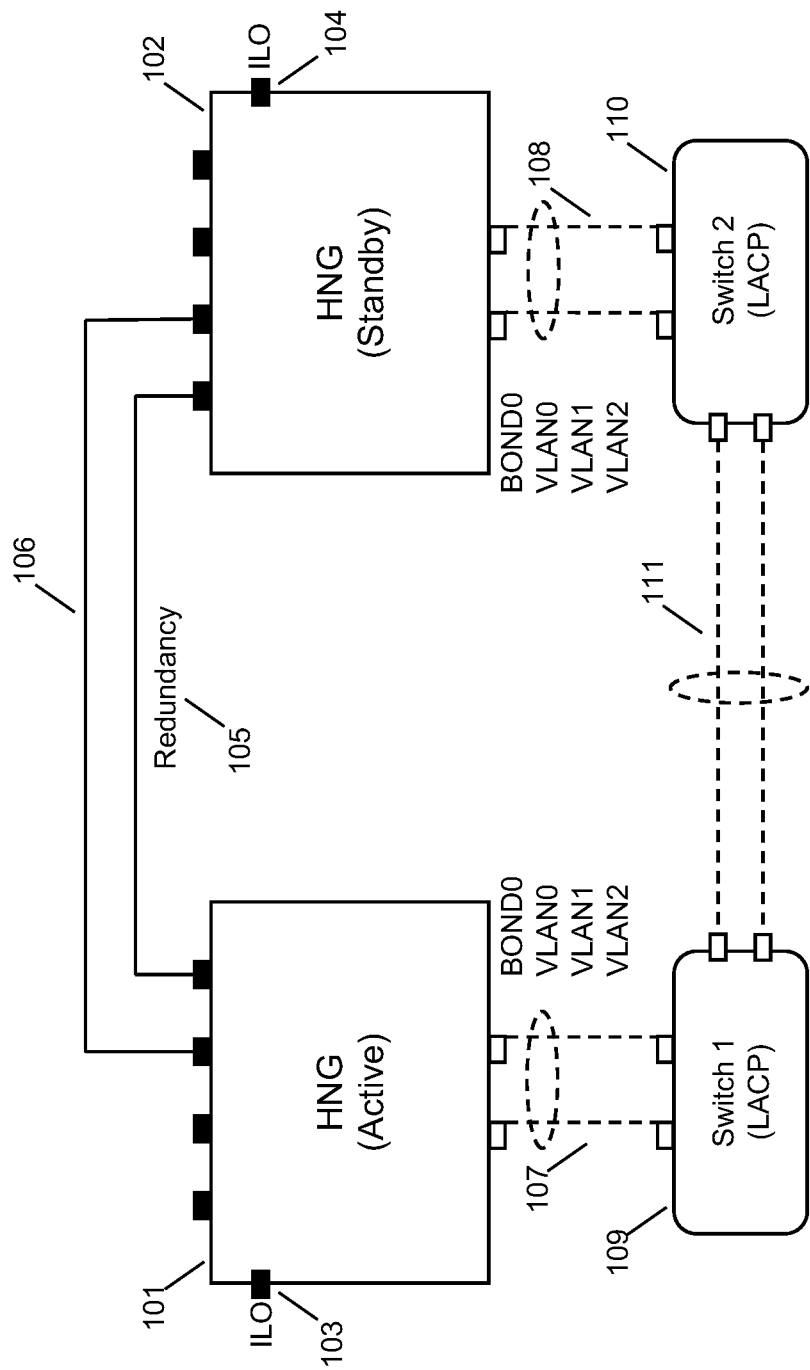
FIG. 1 is a schematic diagram of a network node with active-active redundancy, as known in the prior art.

FIG. 1 is a schematic diagram of a network node with active-active redundancy, as known in the prior art. Network node 101 is a first network node, here a Parallel Wireless Heterogeneous Network Gateway™ or HNG, in an active role and network node 102 is a second HNG in a standby role. Links 105 and 106 connect the active HNG 101 with the standby HNG 102 and provide dedicated or high-speed data transfer between them so that the standby node 102 can be kept in close sync with the active node 101. The links may of course be over fiber, Ethernet, or any medium, and the links may also be shared links or standard Internet Protocol (IP) links.

ILO management ports 103 and 104 provide out-of-band integrated lights-out (ILO) management of nodes 101 and 102, in some cases using Ethernet, using an embedded operating system to enable the nodes to be reset when unresponsive, powered up from a remote location, turn on a remote system console, mount a physical CD or drive, access a management log, or send or receive other messages or requests for management, even when the node's own operating systems are not functioning. When a virtual server is used, the use of a hypervisor or other out-of-band management interface could be used and accomplishes the same purpose.

Network switch 1 109 and network switch 110 are shown. Network switch 1 109 and network switch 110 use link aggregation; shown here is a link aggregation control protocol (LACP)-compliant link aggregation system. The LACP protocol and IEEE 802.2ad and 802.1 are hereby incorporated by reference in their entirety for all purposes. The switches are connected to each other 111, and also provide aggregated links 107 to node 101 and aggregated links 108 to node 102. The aggregated links include virtual bonded links (e.g., BOND0), as well as virtual local area network interfaces (e.g., VLAN0-VLAN2). Several VLANs can be used to provide logical separation of traffic. Interface BOND0 can be used to use the bandwidth of all links, thereby providing a higher-bandwidth connection. Network switch 1 109 and network switch 110 provide connection to the network operator's network, including the access network (not shown) and the core network (not shown), and network nodes 101 and 102 are used to provide services to nodes on the access network or the operator core network.

In operation, network node 101 may fail and may become unresponsive, at which time network node 102, which is on standby as a "hot spare," is activated with minimal delay. Since all data is being synced between 101 and 102, resumption of operation is possible without data loss or delay even when node 101 suddenly and completely fails. This architecture and deployment pattern is called N+1 redundancy or active-passive failover. In some embodiments node 101 and node 102 can be configured in an active-active configuration. Such a configuration involves the use of both node 101 and node 102 in an operational configuration, e.g., providing services to users, but with sufficient overhead for the synced, paired node to provide failover when the other node fails.

However, although the architecture shown in FIG. 1 is useful for providing failover, it does not readily scale beyond pairs of nodes. As shown, the requirement that node 102 be synced to node 101 means that in practice a high-bandwidth data link is required, and that it is also necessary for one of the two nodes to have sufficient capacity to take over for the other node, meaning that at any given time a great deal of processing capacity is idle. As well, while this type of setup provides redundancy it does not readily provide scalability, i.e., the capability to handle a growing amount of work, beyond the maximum capacity of a single node. In the prior art, a virtual machine for a management blade plus multiple virtual machines for instance blades is contemplated (chassis-based virtualization). However, such a solution does not overcome the above problems.

A description follows of a new design that overcomes these disadvantages. The present scaling and redundancy design is a more generic and flexible design that assumes only the typical requirements of the virtual functions often used in telecommunications. It makes very minimal design assumptions on the underlying platform/environment so that it can adapt to and deploy on individual servers, or on any virtualization environment.

Figure 2:
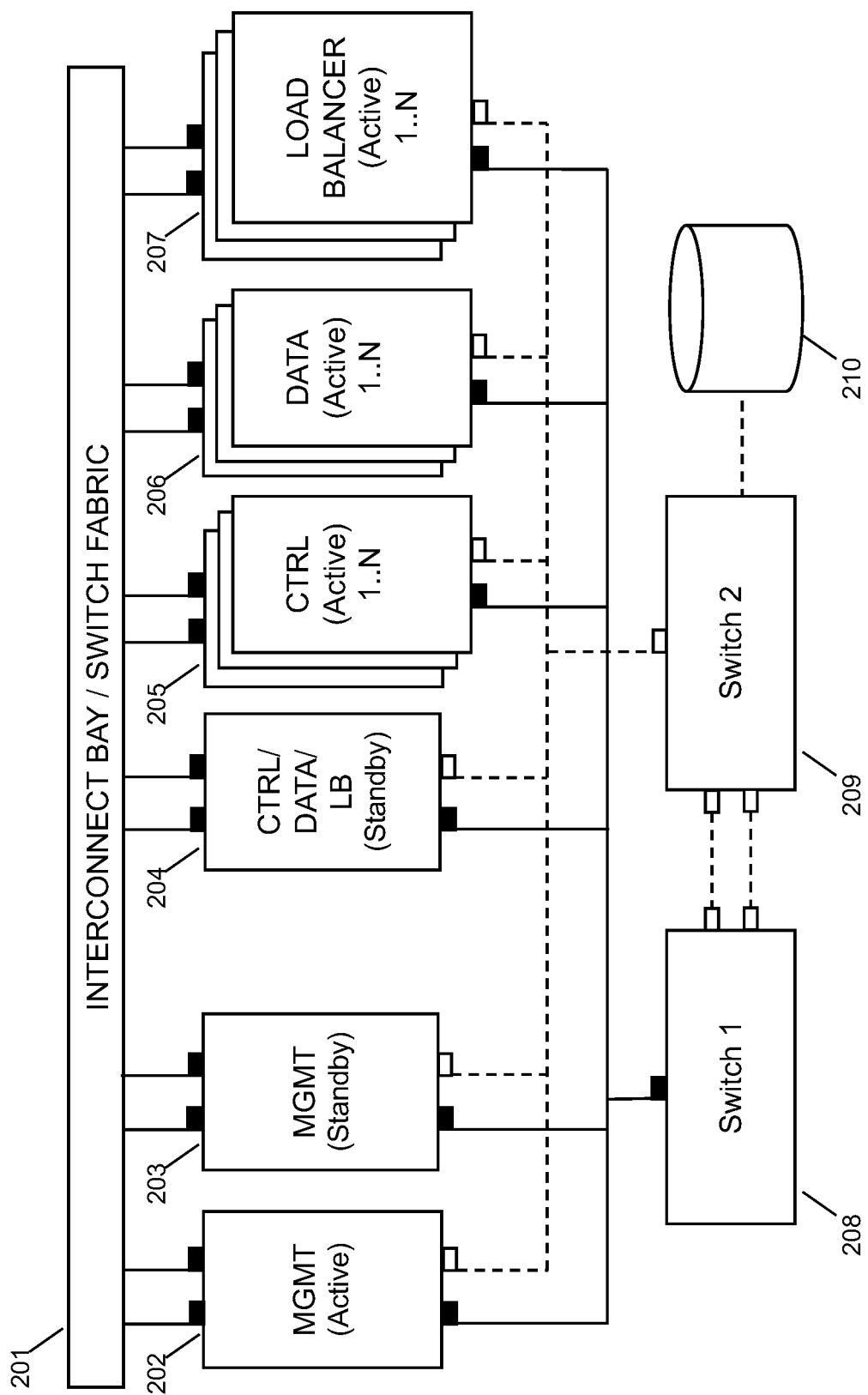
FIG. 2 is a schematic diagram of a scalable network node, in accordance with some embodiments.

FIG. 2 is a schematic diagram of a scalable network node, in accordance with some embodiments. A description follows of the logical functions depicted in FIG. 2.

Management Function

In some embodiments, the management function 202, 203 performs all OAM (operations, administration, and management) and orchestration for the various functions described herein. All OAM Tx traffic directly flows out from this function (not via Load Balancer). It may perform all System management and orchestration of managed nodes; all Configuration management, e.g., of managed base stations or eNodeBs; and all Global SON management. It may perform all other centralized global functionality (E.g. bulk-stats, log, crash file collection from all other blades etc.) This function is designed for 1+1 redundancy (shown here as active 202 and standby 203).

Control Plane Function

In some embodiments, the control plane function 205 performs all application-level control plane processing. For example, a radio acccess network coordinator or orchestrator may perform functions such as: managing base station connections, virtualization and/or proxying, including base station state (UranConn), managing and/or proxying EPC connections (EpcConn), managing connection state of attached UEs (UEMgr), handling IPsec tunnels and encryption functionality (IPSecMgr), etc. The application functions can all be distributed, such that, for example, each application service (like Venb, Vhnb, HNBGW etc.) is distributed across all Control blades. All control plane Tx traffic directly flows out from this function (not via Load Balancer). This function is designed for N+1 redundancy, with an arbitrary number of instances, each instance being active. Additional instances may be created or destroyed as needed (hence scalable).

Data Plane Function

In some embodiments, the data plane function 206 performs all application level data plane processing and forwarding. In some instances a fast path packet accelerator may be used. A fast path packet accelerator provides acceleration of packet processing, including chip-level hardware acceleration or operating system or userspace acceleration software, in some cases facilitated by the use of software to activate such acceleration, such as Intel DPDK, 6Wind, the open source userspace TCP/IP stack OpenFastPath, or any other packet processing accelerator platform. In case of IPsec, it performs all IPsec processing using fast path or a security accelerator. It de-multiplexes all control plane or Management traffic within IPsec to appropriate functions using transport-level forwarding. All Application Data Plane Tx traffic directly flows from this function. In case IPSec enabled with peers, it terminates all IPSec tunnels and, after decryption (or in the absence of IPSec), it processes all application level data plane traffic locally (within fast path); de-muxes all Control plane traffic across Control blades (transport level forwarding for SCTP/TCP/UDP); and de-muxes all Management traffic to Management blades (transport level forwarding for TCP/UDP), thereby directing traffic across the system. The data plane may be responsible for separating traffic flows and sending traffic to the blade or virtualized hardware instance that is handling a particular UE, eNodeB, etc.'s session; new sessions may be directed to the load balancer. This function is designed for N+1 redundancy, with an arbitrary number of instances, each instance being active. Additional instances may be created or destroyed as needed (hence scalable).

Load Balancer Function

In some embodiments, the Load Balancer function 207 performs Layer-3 (IP) load-balancing. It hosts all externally visible virtual IPs and may use fast path for IP forwarding. It maintains mapping of traffic to functions, including maintaining mapping for different types of traffic to blades, and allows applications to configure it. It may perform IP forwarding of all incoming (Rx) traffic to functions based on lookups. Specifically, a blade may be chosen based on load for newer traffic and provides an interface (set of APIs) to program the flow lookup. In some embodiments, traffic is assigned using IP lookups. Virtual IPs, ports, protocol number, sequence number, other IP packet envelope information, or higher-level envelope information may be added/used to allow the load balancer to demux the inbound traffic. All received traffic is forwarded to other blades (no transmitted traffic) based on flow lookup tables. This function is designed for N+1 redundancy, with an arbitrary number of instances, each instance being active. Additional instances may be created or destroyed as needed (hence scalable).

In operation, the load balancer may be stateless and may leverage the database as well. In some embodiments, the load balancer may partition the data such that a load balancer instance is assigned to new traffic, and that instance is tied to that traffic flow throughout the life of that traffic flow. In some embodiments, multiple instances of the load balancer may be instantiated, taking advantage of the stateless nature of the database.

In some embodiments, computational functions are divided based on resource availability and/or latency requirements. For example, functions that have latency constraints are caused to be colocated. In some embodiments, an algorithm for dividing incoming resource requests (including new data or control flows) is used that takes into account latency and current resource availability, using a latency model and a resource availability model, both for existing and for potentially newly-created instances. The load balancer may use such an algorithm for allocating or balancing. The management function may use such an algorithm for instantiating new functions or deallocating functions.

Distributed In-Memory Cluster Database

In some embodiments, the different HNG functions described above will need to share information across blocks. There is a requirement to have a database 210, such as a distributed In-Memory Cluster DB, for this purpose. For example, VoltDB, NuoDB, MemSQL, Aerospike, Cassandra, and other databases may be contemplated for this purpose. The use of a good database with strong consistency and sharding functionality allows a significant portion of the state typically maintained by a network function to be offloaded to the database, in some embodiments, such that this centralized DB can be utilized to maintain UE session state etc. required for redundancy. By leveraging the database in this manner, the pairing requirement is removed for tasks that save their state with peer tasks.

In some embodiments, a common database layer can be used as a data store for both data plane and control plane functions. The database layer can be used to provide, for example, in the case that a control plane function is performing proxying for an eNodeB or a UE, state storage for that eNodeB or UE. Using a sufficiently performant database, such as a low-latency, in-memory database, the control plane or data plane function may do stateless or near-stateless processing of the eNodeB or UE proxying steps, saving state after the processing is completed in the database. This has the advantage of enabling the data or control plane function to be more cleanly virtualized, and resources to thereby be more efficiently utilized, in some embodiments. In some embodiments, database redundancy enables database failures to be handled appropriately without impacting the data or control plane application-layer functions. In some embodiments, the database may be an in-memory database. In some embodiments, a single logical database may run spanning multiple virtual machines.

Additionally, in some embodiments, standby function 204 may provide a processing function (e.g., a blade or virtualized hardware instance) that can be used as a standby or spare for any of the functions described above. This means that there are just 2 additional standby blades, one for Management and the other of the rest of the functions.

Note that, in some embodiments, a given Virtual IP hosted on one of the Load Balancer functions can serve traffic until that Load Balancer does not become the bottleneck. This means that we cannot scale infinitely on a single Virtual IP. The multiple active Load Balancer functions in this design actually refer to scaling with different Virtual IPs.

As a general matter, in some embodiments corresponding to FIG. 2, all blocks in the above diagram are physically uniform (no assumptions on specialized hardware); each block denotes a logical function in the HNG; and each block physically may be one of the following: a blade in a chassis; a Virtual Machine, e.g., on a single 1U server; or a VNF (Virtual Network Function) in a virtualized environment; or another virtual or physical instance. Each block requires means to communicate with other blocks. This could either be a physical interconnect or switch fabric or a virtual internal network. Each block requires means to communicate with external world; each block also requires private disk storage and common shared storage. The set of assumptions made is thereby minimal, namely: that internal communication typically needs to be high-speed; private disk storage requirements are typically low; and that shared disk storage is sufficiently large.

The scaling design found in the present disclosure is believed to be suitable for at least the following three types of deployments.

First, in the case of multiple rack-mountable servers with external (H/w) network switches, each server runs one function described above (load balancer, Control, Data and Mgmt.). All servers are L2 connected (for internal traffic). Each server connected to external switches for Tx traffic.

Second, in the case of multiple Virtual machines or virtual network functions (VNFs) with hypervisor switches. Each Virtual machine runs one function described above. All virtual machines (VMs) are L2 connected (for internal traffic). Each VN connected to external hypervisor switches for Tx traffic.

Third, the design can be used for an all-in-one running on single Virtual machine or natively on a "bare metal" server. This could either be implemented in an optimized way to run in a collapsed model without additional overheads (more like the way it runs today). Or it could be implemented as individual logical functions as depicted above running together with simply short-circuiting the internal traffic locally. This scenario does not scale and will not support redundancy for hardware failures.

In some embodiments, the following network topology may be provided, for example, with reference to the operation of a Parallel Wireless HetNet Gateway™, or HNG. To provide services to access networks (eNBs) and UEs, the network topology involves each HNG system that is externally visible having a unique HNG-ID, and each HNG function described above having a unique HNG-NODE-ID. This enables traffic to be directed by the load balancer even though it is sent and received at a single IP. This enables support for multiple HNGs, as well, in some embodiments. Nodes may see single HNG IP from access and traffic distribution shall happen internally. Core nodes shall see single IP from HNG and traffic distribution may happen internally (as applicable to service). If all blades configure the same Virtual IP on their local loopback IP interface for Tx traffic, in some embodiments their medium access control (MAC) addresses may be configured to match with that of the load balancer hosting the Virtual IP, to avoid the behavior of certain routers that may drop traffic if they see different MACs. The eNodeB (herein called at certain points a CWS) may change outer IP dynamically if it moves to another IPSec GW and preserves the inner IP.

In some embodiments, an L2-based auto-service-discovery procedure is run to identify HNG functions dynamically coming up and going down, and a centralized resource management function that always has an entire view of the live HNG system can be used to make decisions to start/stop/notify functions when HNG nodes and HNG functions dynamically come up and go down.

Regarding configuration, in some embodiments the system need not use a monolithic configuration database. HNG and CWS configuration shall be in different databases. Configuration databases shall be distributable for scaling. Configuration database scaling shall be such that it does not impact system bringup time. Configuration database scaling may be such that CLI command timing is not impacted by the database size. In some embodiments, a Confd multiple Master approach may be used, since many tasks need to write to the Confd for operational data etc. (required by Netconf for CWS stats and CWS generated data).

Figure 3:
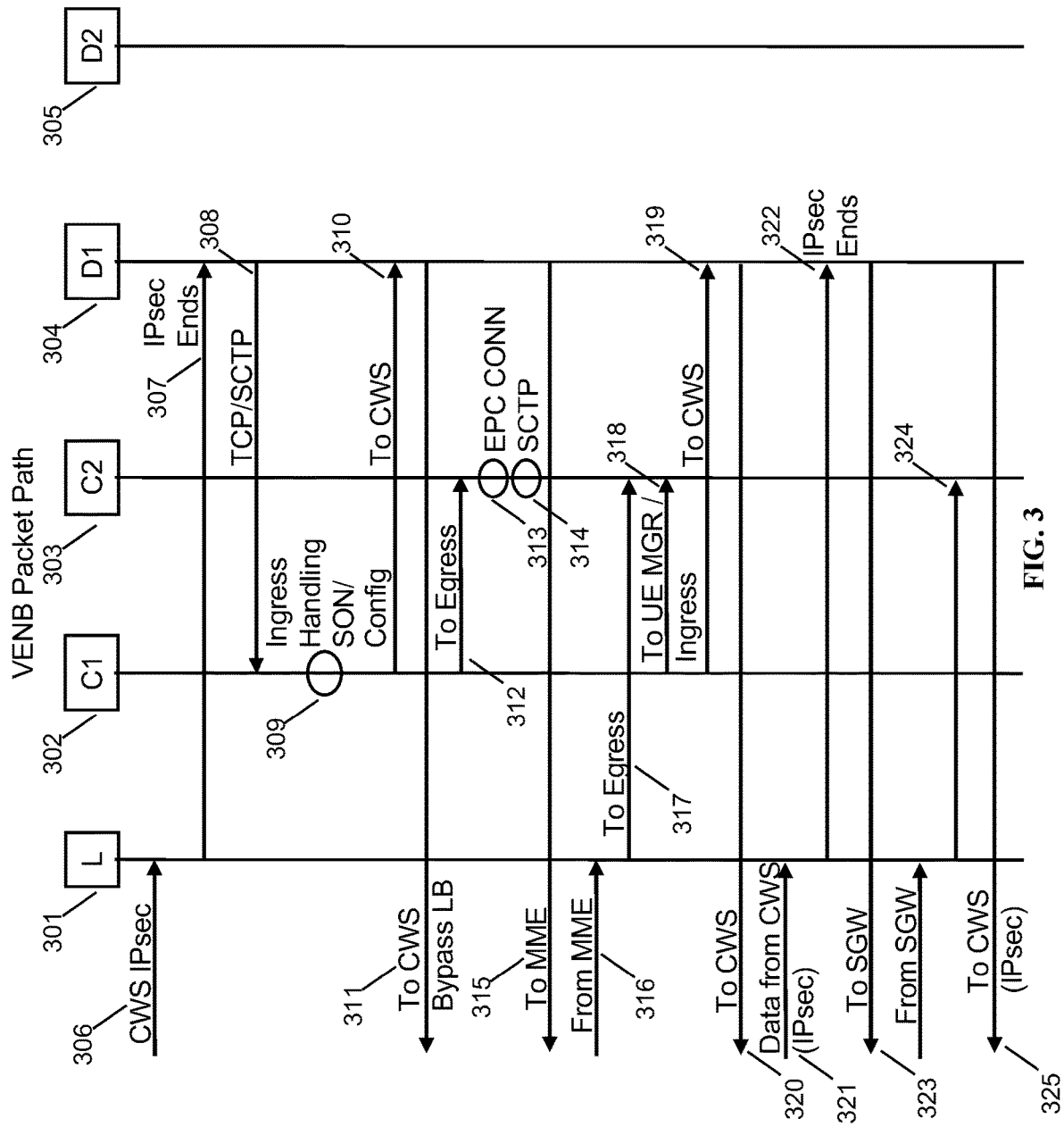
FIG. 3 is a schematic packet flow diagram of traffic at a scalable network node corresponding to a virtual eNodeB usage pattern, in accordance with some embodiments.

FIG. 3 is a schematic packet flow diagram of traffic at a scalable network node corresponding to a virtual eNodeB usage pattern, in accordance with some embodiments. Traffic is shown as arrows, but the arrows may or may not correspond to any particular packet, in the data flow, in some embodiments; rather, the arrows are illustrative in nature. Load balancing function 301, control plane function 302, control plane function 303, data plane function 304, and data plane function 305 are shown; control plane function 302 and control plane function 303 are in a 1+1 redundancy relationship, i.e., they are both active and handling different data requests. At step 306, an encrypted inbound request from a managed eNodeB (marked CWS), intended for the core network, is received at the load balancer. The load balancer sends (307) the encrypted traffic to data plane function 304, which decrypts the data. Once the data is decrypted, a TCP/SCTP flow is sent (308) to control plane function 302. Ingress handling occurs at C1 (309), and data plane traffic is sent (310) to D1, which sends (311) the data to the CWS, bypassing the load balancer.

Separately, C1 sends (312) the core network portion of the traffic to C2. C2 is running an EPC stateful processing function 313 and a SCTP function 314; the division of functionality is between C1, which handles the eNB state (e.g., ingress), and C2, which handles EPC state (e.g., egress). The data plane traffic for the MME is sent to D1 and sent out to the MME. MME inbound traffic 316 is directed (317) by the load balancer to C2, which is handling egress. C1 may continue to send messages (318) to C2 for processing, and back to the requesting base station (319, 320). Data plane traffic that is encrypted goes from the base station (321) in an encrypted form to the data plane function (322), where it is encrypted and sent to the SGW (323). Receiving SGW signaling is handled (324) by C2 and data from the SGW to the CWS is sent (325) via data plane function 304. Data plane function 305 is not needed for processing for this particular eNodeB.

Figure 4:
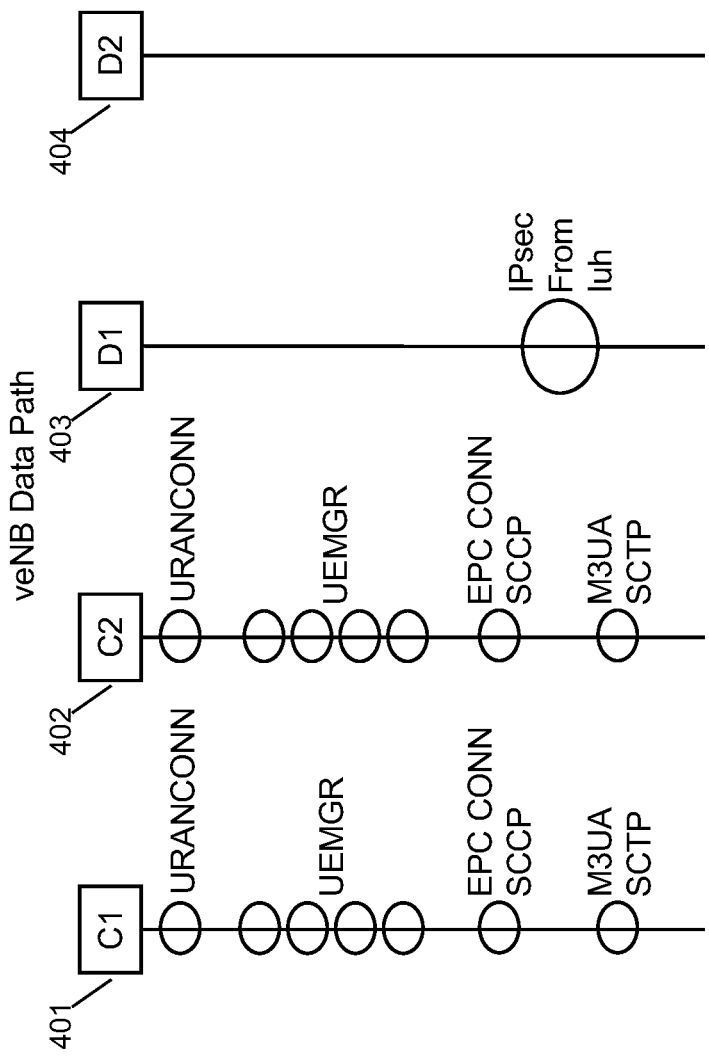
FIG. 4 is a schematic data flow diagram of traffic at a scalable network node corresponding to a virtual eNodeB usage pattern, in accordance with some embodiments.

FIG. 4 is a schematic data flow diagram of traffic at a scalable network node corresponding to a virtual eNodeB usage pattern, in accordance with some embodiments. Traffic is shown as arrows, but the arrows may or may not correspond to any particular packet, in the data flow, in some embodiments; rather, the arrows are illustrative in nature. Control plane functions C1 401 and C2 402 are shown; as well, data plane functions D1 403 and D2 404 are shown. FIG. 4 roughly corresponds to FIG. 3. Control plane function C1 401 is a virtual function or blade that is running a virtualized URANCONN (a management function for a particular virtual eNodeB), and four virtual UE manager functions, and an EPC connection manager function configured to send and receive communications with a core network node using the Skinny Client Control Protocol (SCCP), and a Signaling System 7 (SS7) Message Transfer Part 3 user adaptation (M3UA) message (as defined by IETF RFC 4666, hereby incorporated by reference in its entirety) function for virtualizing and coordinating communications using the M3UA protocol to and from the core network. Control plane function C2 402 is running another virtualized instance of each of the functions on 401, but handling different data flows; as the flows are sent to either C1 or C2 depending on the inbound flow, it is possible to allocate or deallocate control plane functions as required. Data plane function 403 handles the decryption and encryption of communications from a particular UE or set of UEs received over the Iuh protocol from a base station. Data plane function 404 is unutilized and can be allocated/deallocated as needed, depending on usage.

Figure 5:
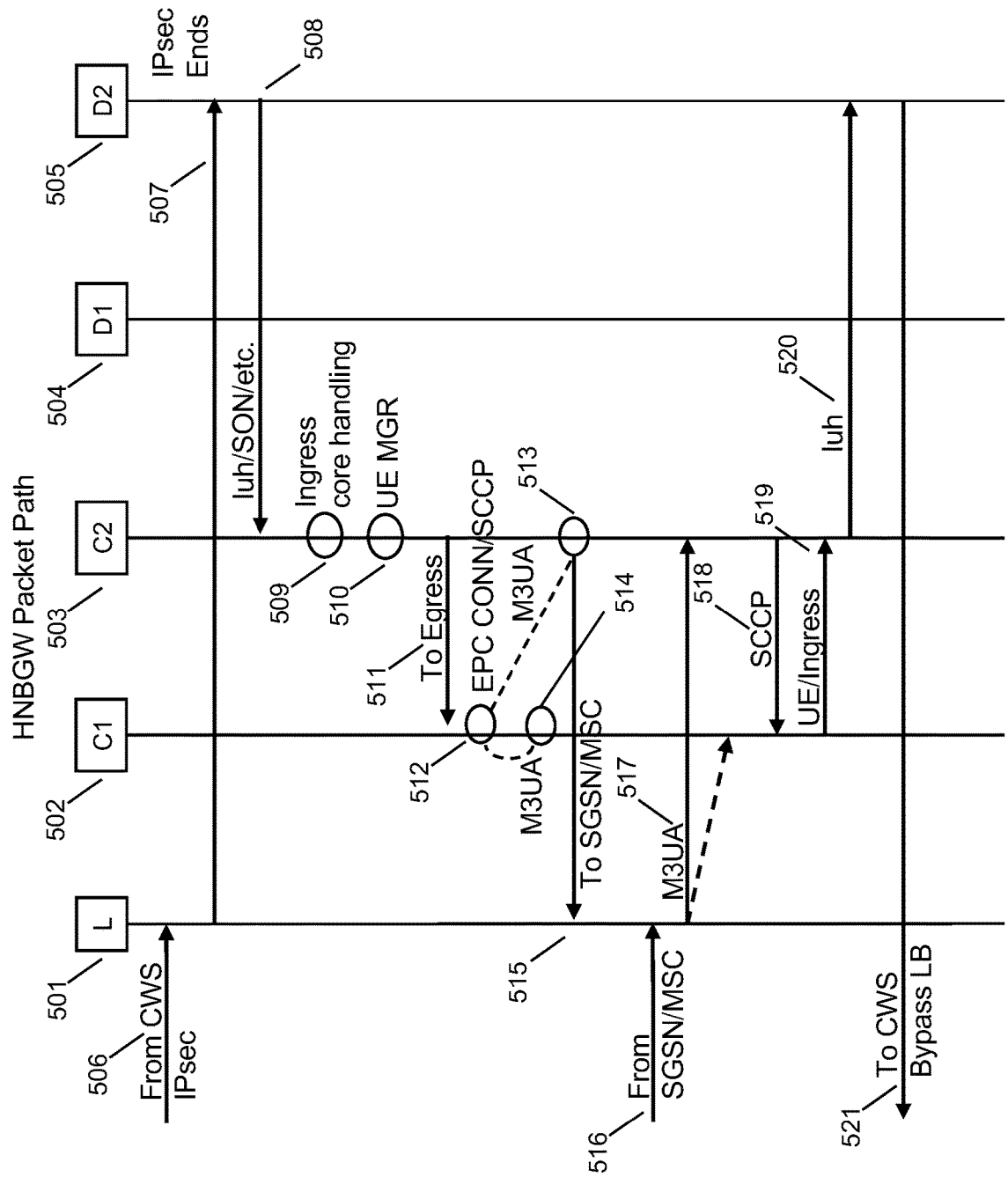
FIG. 5 is a schematic packet flow diagram of traffic at a scalable network node corresponding to a home NodeB gateway usage pattern, in accordance with some embodiments.

FIG. 5 is a schematic packet flow diagram of traffic at a scalable network node corresponding to a home NodeB gateway usage pattern, in accordance with some embodiments. Traffic is shown as arrows, but the arrows may or may not correspond to any particular packet, in the data flow, in some embodiments; rather, the arrows are illustrative in nature. Load balancer L 501, control plane function C1 502, control plane function C2 503, data plane function D1 504, and data plane function D2 505 are shown. At 506, data is received from a CWS (e.g., an eNB or HeNB or HNB); it is encrypted. The data is forwarded 507 by the load balancer to data plane function D2, which decrypts it, determines that it is Iuh or SON or other signaling traffic, and sends it 508 to control plane function C2 503. Control plane function C2 503 includes ingress and core handling module 509 and UE manager function 510. These functions interact with the data and generate a control plane message which is sent 511 to control plane node C1 502 for egress.

At control plane function C1, an EPC module 512 and an M3UA module 514 may be present. M3UA module 513 may also be present on C2, and traffic may be mirrored at C1 to enable hot-swap failover to C2 for this particular flow, while C2 handles the communications 515 with the SGSN/MSC.

At step 516, M3UA traffic is received from the SGSN/MSC, and load balancer 501 sends 517 that traffic both to C2 and to C1, for failover/sync purposes. C2 may handle the SCCP 518 and UE/ingress 519 communications. Data is forwarded via Iuh 520 to data plane function 505, which sends to CWS directly 521, bypassing the load balancer.

Figure 6:
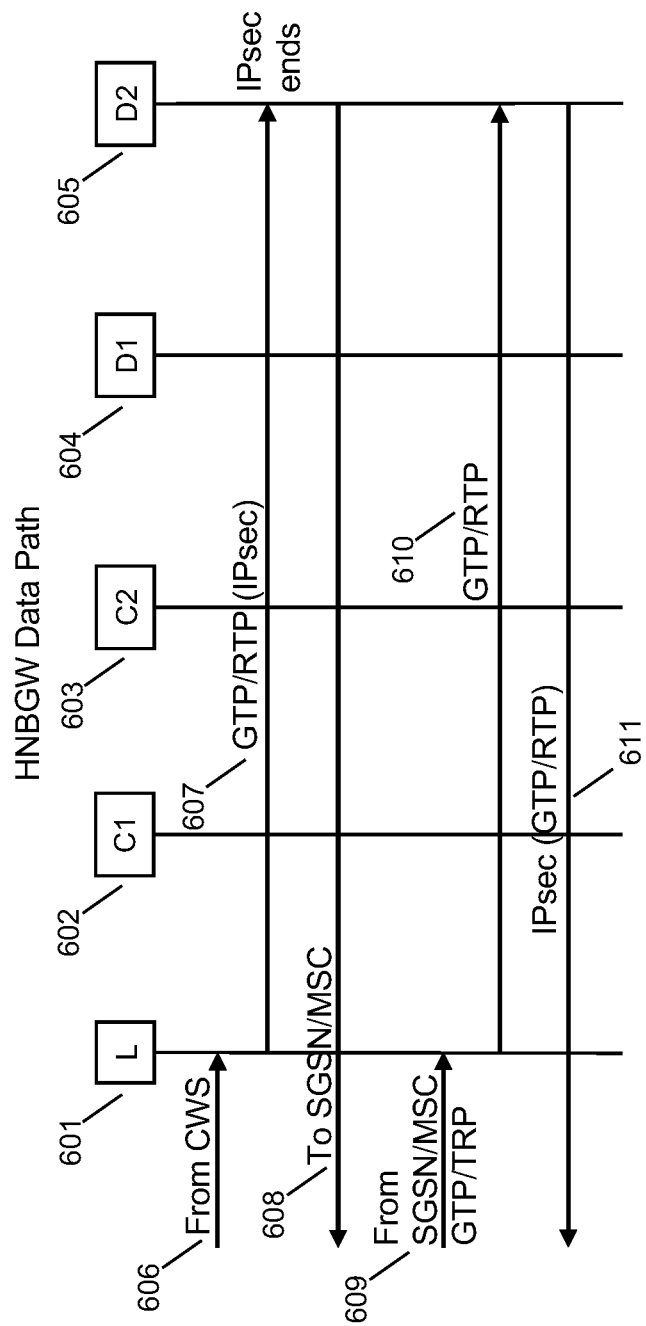
FIG. 6 is a schematic data flow diagram of traffic at a scalable network node corresponding to a home NodeB gateway usage pattern, in accordance with some embodiments.

FIG. 6 is a schematic data flow diagram of traffic at a scalable network node corresponding to a home nodeB gateway usage pattern, in accordance with some embodiments. Traffic is shown as arrows, but the arrows may or may not correspond to any particular packet, in the data flow, in some embodiments; rather, the arrows are illustrative in nature. Load balancer 601, control plane functions C1 602 and C2 603, and data plane functions D1 604 and D2 605 are shown. FIG. 6 roughly corresponds to FIG. 5. Load balancer 601 receives inbound flows from the radio access network 606 and from the core network 609, and in the case of encrypted or encapsulated tunnels, forwards them to a data plane function, in this case data plane function D2 605, which decrypts (607)/deencapsulates (610) and demuxes these flows. As in the illustrated case no processing is needed beyond forwarding the data, data plane function D2 605 forwards the received data, in the case of data flow 606 to the SGSN 608, or in the case of data flow 609 to the radio access network 611. Control plane functions C1 602 and C2 603 are not part of the HNBGW data path. Data plane function D1 604 is unutilized and can be allocated/deallocated as needed, depending on usage.

Figure 7:
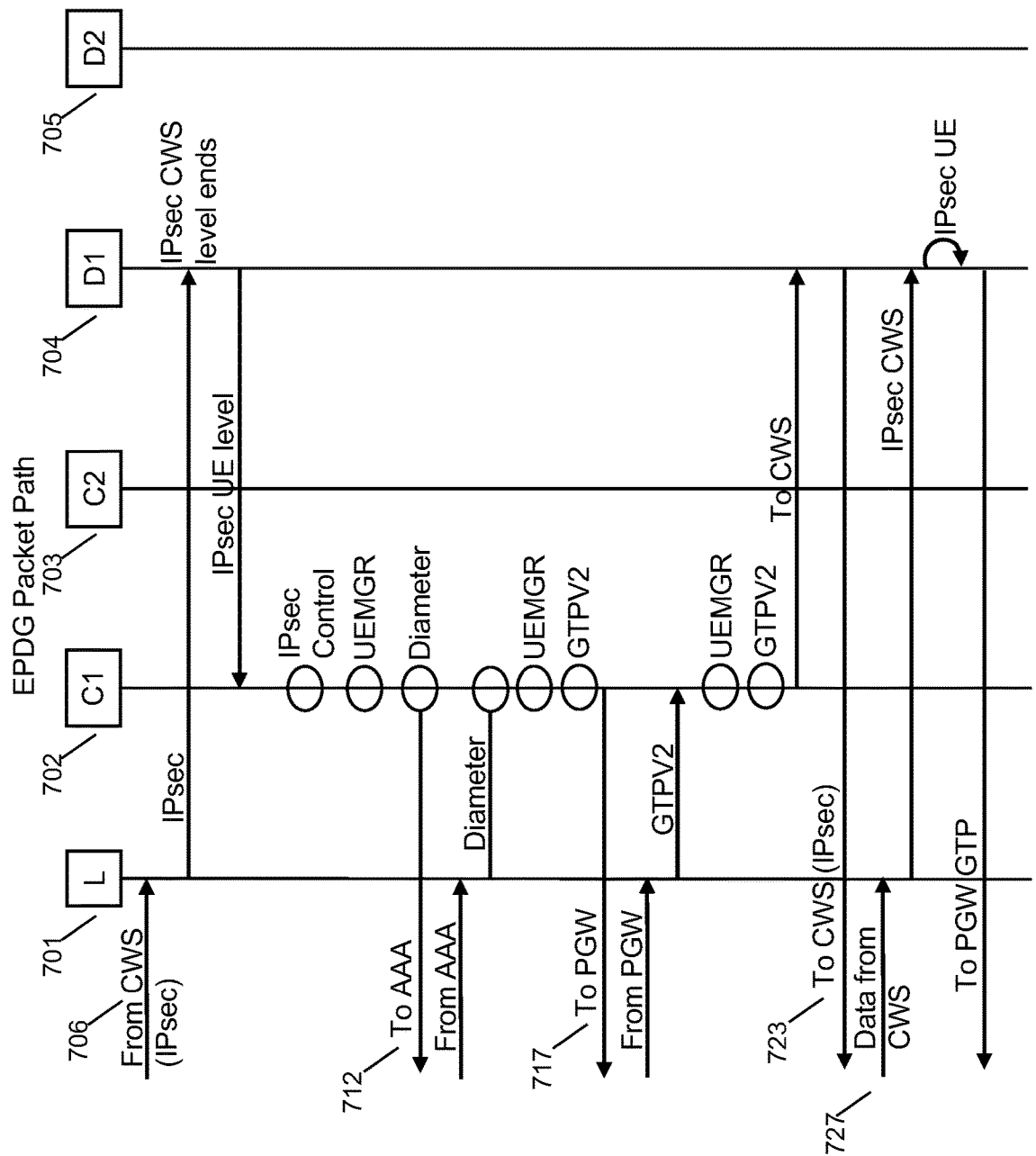
FIG. 7 is a schematic packet flow diagram of traffic at a scalable network node corresponding to an ePDG gateway usage pattern, in accordance with some embodiments.

FIG. 7 is a schematic packet flow diagram of traffic at a scalable network node corresponding to an ePDG gateway usage pattern, in accordance with some embodiments. Traffic is shown as arrows, but the arrows may or may not correspond to any particular packet, in the data flow, in some embodiments; rather, the arrows are illustrative in nature. Load balancer 701, control plane functions C1 702 and C2 703, and data plane functions D1 704 and D2 705 are shown. An IPsec data flow is received 706 from a base station or wireless (e.g., Wi-Fi) access point. The data is sent by L to D1, where decryption is performed. Contacting a Diameter authentication server 712 is performed once the decrypted data is sent to control plane function C1. At 717, the now-authenticated data flow is able to access the PGW.

Continuing, when receiving data from the PGW, the data is sent first as GTP-encapsulated data to C1 702, and then to the data plane processing function D1 704, which encrypts and directly sends the data 723. Similarly, received data 727 from the CWS is decrypted and encapsulated into a GTP tunnel by D1 704. D2 is not used and can be deallocated in this example.

Figure 8:
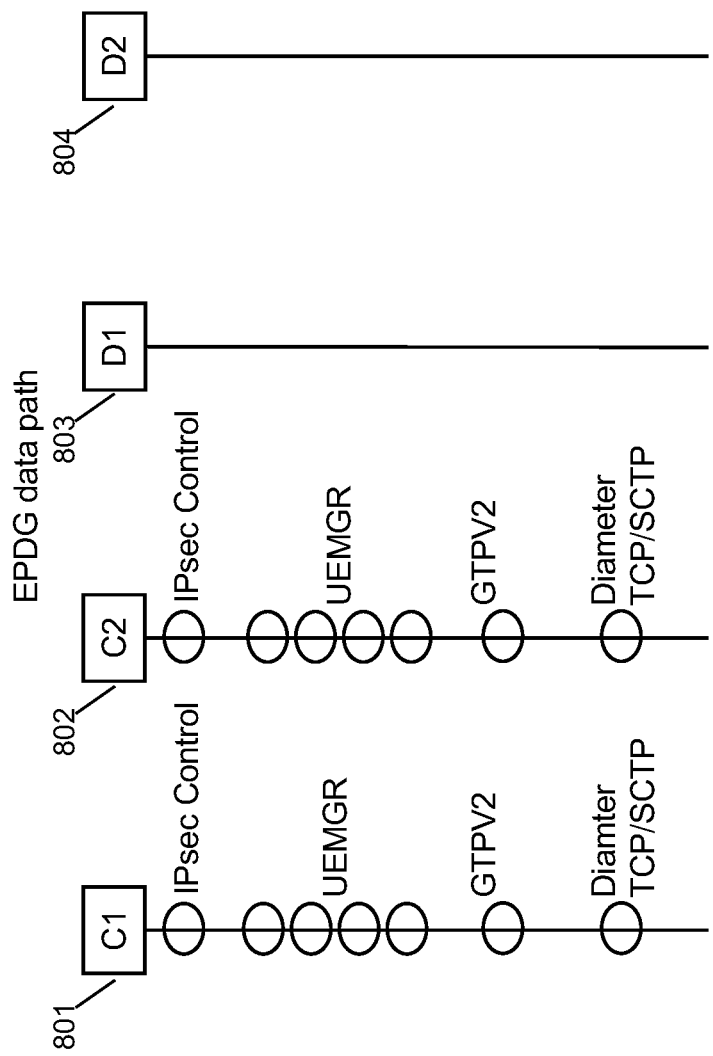
FIG. 8 is a schematic data flow diagram of traffic at a scalable network node corresponding to an ePDG gateway usage pattern, in accordance with some embodiments.

FIG. 8 is a schematic data flow diagram of traffic at a scalable network node corresponding to an ePDG gateway usage pattern, in accordance with some embodiments. Traffic is shown as arrows, but the arrows may or may not correspond to any particular packet, in the data flow, in some embodiments; rather, the arrows are illustrative in nature. Control plane functions C1 801 and C2 802 are shown; as well, data plane functions D1 803 and D2 804 are shown. FIG. 8 roughly corresponds to FIG. 6. Control plane function C1 801 is a virtual function or blade that is running a virtualized IPsec control function, and four virtual UE manager functions, and a GPRS tunneling protocol version 2 (GTPv2) coordination function, and a Diameter TCP/SCTP authentication manager function. Control plane function C2 802 is running another virtualized instance of each of the functions on 801, but handling different data flows; as the flows are sent to either C1 or C2 depending on the inbound flow, it is possible to allocate or deallocate control plane functions as required. Data plane function 803 handles the decryption and encryption of communications from a particular UE or set of UEs received over the Iuh protocol from a base station. Data plane function 804 is unutilized and can be allocated/deallocated as needed, depending on usage.

The above architecture thus enables the creation of a network node, such as an HNG, that supports N+1 redundancy, e.g., with an arbitrary number of instances, each instance being active. Additional instances may be created or destroyed as needed (hence scalable). In some embodiments, the present architecture may be used in a variety of telecom-related processing applications, and the scaling architecture may be created in a way to handle different services such as a home eNodeB gateway (HNBGW or HeNBGW), virtual eNodeB (VENB), evolved packet data gateway (ePDG), trusted wireless access gateway (TWAG), multicell/multicast coordination entity (MCE), evolved multimedia broadcast multicast services gateway (eMBMS-GW), security gateway (SecGW), or X2 gateway (X2GW), or a self-organizing network (SON) server, or any proxying or virtualization server for any of the preceding network functions, or any combination thereof. This scaling thus also enables the utilization virtualization techniques to scale across multiple blades by adding more VMs. Scaling is also enabled for a heterogeneous network node or heterogeneous network gateway, in some embodiments, as this architecture is suitable for a wide variety of telecommunications-oriented applications that can be split up into data-plane and control-plane processing domains. This architecture is also suitable for virtualizing network control functions in the forthcoming 5G network architecture, which is set up to separate control plane and data plane functions and is therefore well-suited for the described architecture.

In some embodiments, geographical redundancy is also supported by some embodiments. Although geographical redundancy is targeted for disaster scenarios only, a standby system at a remote place may be used. The remoteness of the network link may cause the redundant HNG to be cold-standby, i.e. configuration-ready, and may cause certain failovers to be service-impacting i.e. UE session state and peer connectivity may be lost, in some embodiments.

As will be understood by those skilled in the art, the present invention may be embodied in other specific forms without departing from the spirit or essential characteristics thereof. The scalable architecture described may be used in or may apply to LTE-compatible networks, to UMTS-compatible networks, or to networks for additional protocols that utilize radio frequency data transmission.

Where the word "blade" is used in the present disclosure, it is understood that one or more instances of a virtual machine that are described as running on a "blade" may instead be running on a virtual machine or other virtualized hardware, and that software modules/functions may be running on virtualized hardware, which has the advantage of being able to be scaled up or down based on load; virtual or physical hardware may be used that is shared with other telecom operators, other data center customers, other customers or users, other operators, etc. Stated another way, the present disclosure contemplates a wide variety of physical or virtual hardware for running the functions described herein, as long as the hardware is coupled in the manned described herein.

In the present disclosure, the words "eNB," "eNodeB," and "gNodeB" are used to refer to a cellular base station. However, one of skill in the art would appreciate that it would be possible to provide the same functionality and services to other types of base stations, specifically to home eNodeBs (HeNodeBs) and gNodeBs, as well as any equivalents.

In the present disclosure, the words "federated," "virtualized," "proxy" or "proxied" may be viewed as aspects of the same concept. For example, it may be understood that an HNG or federated X2 gateway provides X2 virtualization, in that it federates X2 messages from a plurality of eNodeBs and virtualizes the plurality of eNodeBs to provide a single virtualized eNodeB. The X2 gateway provides this federation or virtualization at least in part by providing proxy functionality, such that X2 messages from each of the plurality of eNodeBs may be proxied by the X2 gateway to and from an EPC or core network node. Other meanings would be apparent to one having ordinary skill in the relevant technology area. The X2 gateway could be part of an LTE access controller or core network node, part of an eNodeB, co-located with another device, or on its own independent device.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc.

Various alternative embodiments are also contemplated by the inventors. For example, certain functions may be performed at an eNodeB, or at a multi-radio access technology node (multi-RAT) node, instead of at a virtualization server. The virtualization server may be known as an LTE access controller. The functions of the virtualization server may be broken up and spread across multiple network nodes, or multiple software or hardware functions within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the virtualization server, within a function performing radio resource allocation and coding selection, or at another location. In some embodiments, a virtualization server may identify and initiate power adjustments to improve channel quality.

In some embodiments, the mesh network nodes may provide complete or partial guesses at what paths are the optimal or best paths during a particular time interval, and may be enabled to send messages back to the virtualization server to communicate these complete or partial guesses.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. Various hardware or software components in the devices described herein may be added, removed, or substituted with those having the same or similar functionality. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method for orchestrating a radio access network, comprising:
   performing system management functions and sending system management traffic;
   receiving user mobile device data and forwarding the user mobile device data to the user mobile device or to a mobile operator core network, and at least two of decrypting, demultiplexing and forwarding system management traffic, and at least two of decrypting, demultiplexing and forwarding control plane traffic;
   receiving, by at least one load balancer, user mobile device control traffic and user mobile device data traffic, and redirecting at least one of the user mobile device control traffic, and the user mobile device data traffic; and
   supporting failover of load balancers.

2. The method of claim 1, further comprising using a distributed configuration database, the distributed configuration database containing state information of each individual user mobile device in communication with and managed by the scalable network orchestrator.

3. The method of claim 1, further comprising supporting addition, subtraction, and failover of load balancers without termination of active user mobile device data connections to the operator core network.

4. The method of claim 1, wherein the orchestrating is for a heterogeneous network and includes providing a scalable hardware platform for one or more of a HNBGW, a HeNBGW, a VENB, a ePDG, a TWAG, a MCE, a eMBMS-GW, a SecGW, and a X2GW.

5. The method of claim 2, wherein the orchestrating is for orchestrating both a radio access network and the operator core network.

6. The method of claim 2, wherein the distributed configuration database is an in-memory database.

\* \* \* \* \*